United States Patent
Marsh

(10) Patent No.: US 11,630,179 B2
(45) Date of Patent: Apr. 18, 2023

(54) SYSTEMS AND METHODS OF CALIBRATING A HELIOSTAT

(71) Applicant: William Quinn Marsh, Hemet, CA (US)

(72) Inventor: William Quinn Marsh, Hemet, CA (US)

(73) Assignee: Light Manufacturing, Inc., Springfield, MA (US)

( * ) Notice: Subject to any disclaimer, the term of this patent is extended or adjusted under 35 U.S.C. 154(b) by 0 days.

(21) Appl. No.: 17/397,793

(22) Filed: Aug. 9, 2021

(65) Prior Publication Data

US 2022/0043096 A1    Feb. 10, 2022

Related U.S. Application Data

(60) Provisional application No. 63/063,129, filed on Aug. 7, 2020.

(51) Int. Cl.
*G01S 3/78* (2006.01)
*G01S 3/786* (2006.01)

(52) U.S. Cl.
CPC .......... *G01S 3/7803* (2013.01); *G01S 3/7861* (2013.01)

(58) Field of Classification Search
CPC .............................. G01S 3/7803; G01S 3/7861
See application file for complete search history.

(56) References Cited

U.S. PATENT DOCUMENTS

| | | | | |
|---|---|---|---|---|
| 9,010,317 B1* | 4/2015 | Gross | ...................... | F24S 50/20 126/573 |
| 2002/0171042 A1* | 11/2002 | Chen | ...................... | G01T 1/2928 250/390.04 |
| 2008/0087274 A1* | 4/2008 | Chen | ...................... | F24S 50/20 126/600 |
| 2008/0236568 A1* | 10/2008 | Hickerson | .............. | F24S 30/452 126/578 |
| 2009/0107485 A1* | 4/2009 | Reznik | ..................... | F24S 50/20 126/600 |
| 2011/0000478 A1* | 1/2011 | Reznik | ..................... | F24S 23/77 126/574 |
| 2012/0123720 A1* | 5/2012 | Fukuba | .................. | H02S 50/00 702/94 |
| 2013/0139804 A1* | 6/2013 | Goldberg | ................ | F24S 50/20 126/578 |

(Continued)

FOREIGN PATENT DOCUMENTS

AU    2015235280 B2 *    10/2017    .............. F24S 50/20

OTHER PUBLICATIONS

Malan, Karel Johan, "A Heliostat Field Control System": format pdf: 129 pages: Available at http://scholar.sun.ac.za/handle/10019.1/86674: Last Accessed Apr. 29, 2022 (Year: 2014).*

*Primary Examiner* — Daniel L Greene
(74) *Attorney, Agent, or Firm* — Bulkley, Richardson and Gelinas, LLP; Mary R. Bonzagni, Esq.

(57) ABSTRACT

A heliostat calibration system having a system controller, and a heliostat having a heliostat controller, wherein: the system controller is configured to receive a calibration data point and initial calibration offset angle guess, calculate a tracking error, identify a calibration offset angle, and the heliostat controller configured to transmit a calibration data point, receive adjustment instructions, and execute the adjustment instructions.

10 Claims, 12 Drawing Sheets

(56) References Cited

U.S. PATENT DOCUMENTS

| | | | |
|---|---|---|---|
| 2015/0357966 A1* | 12/2015 | Noriega Gil | G05B 13/041 |
| | | | 700/287 |
| 2016/0084530 A1* | 3/2016 | Pilegaard | F24S 30/452 |
| | | | 126/714 |
| 2016/0154082 A1* | 6/2016 | Plourde | F24S 23/74 |
| | | | 250/203.4 |
| 2016/0161151 A1* | 6/2016 | Wissenz | F24S 23/80 |
| | | | 126/714 |
| 2018/0274819 A1* | 9/2018 | Sánchez González et al. | |
| | | | F24S 50/20 |
| 2021/0110571 A1* | 4/2021 | Zhu | G06T 7/74 |

* cited by examiner

SYSTEMS AND METHODS OF CALIBRATING A HELIOSTAT

CROSS-REFERENCE TO RELATED APPLICATION

This application claims the benefit of U.S. Provisional Application No. 63/063,129, filed on Aug. 7, 2020, which is incorporated herein by reference in its entirety.

BACKGROUND

Manufacturing process for plastic products typically includes heating various forms of plastic (e.g., pellets, powders, sheets, etc.) and forming the plastic into the desired shape. One common form of plastic molding is rotational molding. Rotational molding includes a hollow mold that can rotate in all three axis (X, Y, Z axis). The hollow mold is typically formed from a metal or similarly heat-conductive material. A quantity of plastic powder is placed inside the hollow mold. The hollow mold is then moved into an oven where the heat source substantially surrounds the hollow mold. The hollow mold is then rotated and heated in the oven.

The internal mirror angle of a heliostat can become inaccurate over time thereby reducing the amount of reflected light impinging on a target. There is a need to correct the error in the internal mirror angle thereby increasing the amount of light reflected on a target. In particular, the heat source of the oven may comprise a heliostat. The internal mirror angle of the heliostat can become inaccurate over time thereby reducing the amount of reflected light impinging on a target such as the hollow mold. There is a need to correct the error in the internal mirror angle thereby increasing the amount of light reflected on a target hollow mold.

SUMMARY OF THE INVENTION

The present disclosure pertains to a heliostat calibration system having a system controller, and a heliostat having a heliostat controller, wherein the system controller is configured to receive a calibration data point and initial calibration offset angle guess, calculate a tracking error, identify a calibration offset angle, and the heliostat controller configured to transmit a calibration data point, receive adjustment instructions, and execute the adjustment instructions. Another aspect of the disclosure is a system wherein the heliostat controller is configured to receive an acceptable tracking error value. Another aspect of the disclosure is a system wherein the system controller is configured to calculate the tracking error by utilizing the modified reflection equation. Another aspect of the disclosure is a system the system controller is configured to identify the final tracking error. Another aspect of the disclosure is a system the system controller is configured to identify the calibration offset angle.

Another aspect of the disclosure is a method having the steps of, by a system controller, receiving a calibration data point, receiving an initial calibration offset angle guess, calculating a tracking error, identifying a calibration offset angle, and by a heliostat controller, transmitting a calibration data point, receiving adjustment instructions, and executing the adjustment instructions. Another aspect of the disclosure is a method having the step of, by the heliostat controller, receiving an acceptable tracking error value. Another aspect of the disclosure is a method having the step of, by the system controller, calculating the tracking error by utilizing the modified reflection equation. Another aspect of the disclosure is a method having the step of, by the system controller, identifying the final tracking error. Another aspect of the disclosure is a method having the step of, by the system controller, identifying the calibration offset angle.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
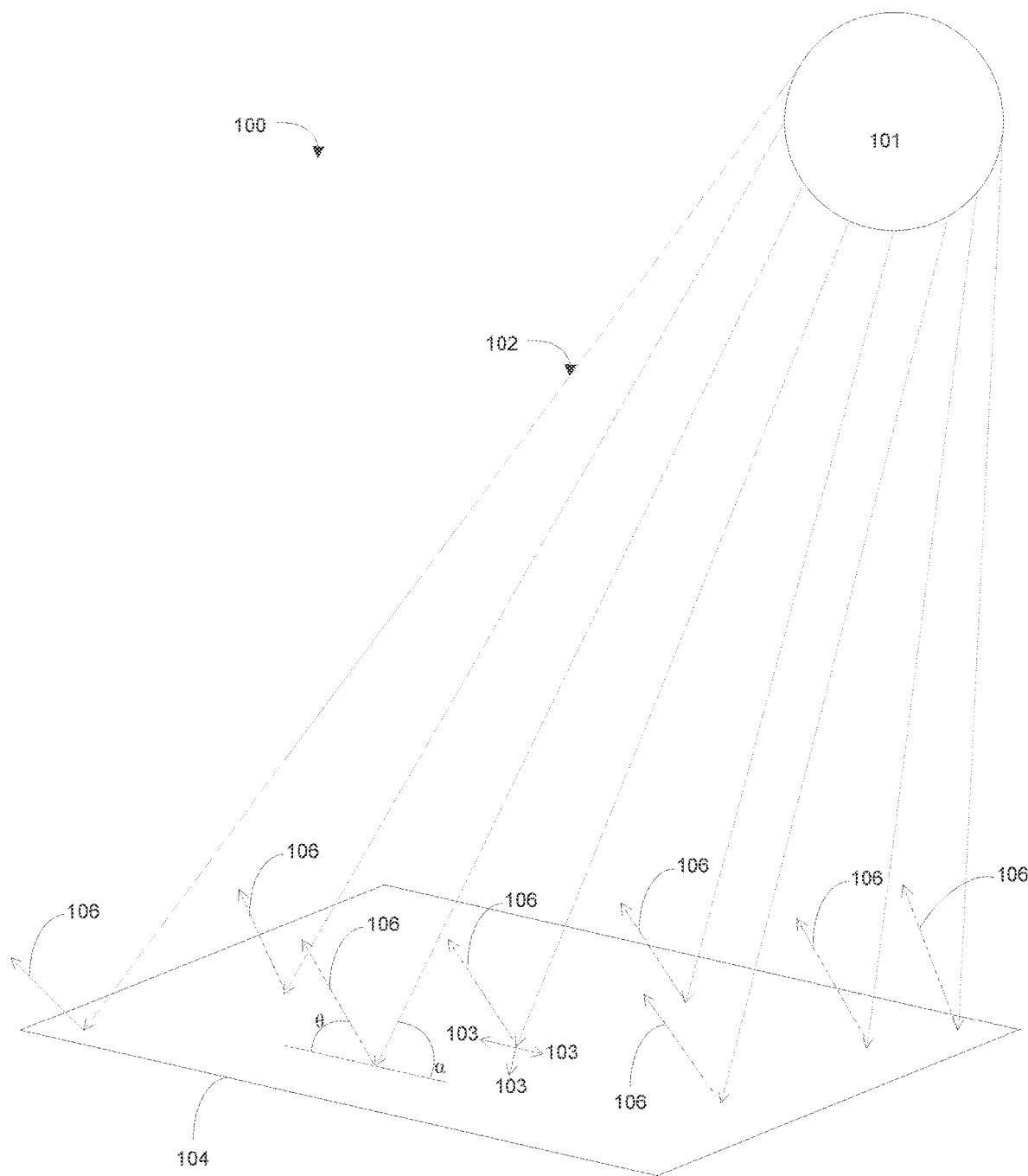
FIG. 1A is a schematic diagram of a flat surface, in accordance with one embodiment.

To aid in understanding aspects of the invention described herein, some terms used in this description are defined below.

By "Altitude Angle" is meant the angle from a position with respect to the horizon.

By "Azimuth Angle" is meant the angle from a position with respect to true North.

By "Calibration Data Point" is meant data having a 'Sun Position' and an 'Internal Mirror Position' of the heliostat at a point in time when the heliostat is successfully reflecting sunlight to the 'Calibration Target'.

By "Calibration offset angle" is meant the amount of error in the internal mirror angle of the heliostat. The calibration offset angle can include altitude and azimuth angles, i.e. the difference between the internal mirror angle pair and the true mirror angle pair.

By "Calibration Target" is meant a point onto which the heliostat can reflect sunlight.

By "Internal Mirror Angle" is meant the mirror angle at a point in time with respect to the internal indexing hardware (e.g. limit switch) of the heliostat.

By "True Mirror Angle" is meant the mirror angle at a point in time with respect to external references such as true North and the horizon.

By "Target Position" is meant the direction from the heliostat to the target. The target position can be defined as an Altitude and Azimuth angled pair.

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure comprises methods, systems, and devices that in conjunction with novel software, algorithms, and processes can identify the amount of error in the internal mirror angle of a heliostat 120. The methods, systems, and devices described herein can be used to calibrate or correct the error in the internal mirror angle.

The present disclosure pertains in part to a heliostat calibration system 400 configured to determine the amount of error in the internal mirror angle of a heliostat 120.

In some embodiments, the heliostat calibration system 400 can include a system controller 200 and/or a heliostat controller 126.

In some embodiments, the heliostat calibration system 400 can have a system controller 200. The controller 200 can be a computing device that can be a standalone device, a server, a laptop computer, a tablet computer, a netbook computer, a personal computer (PC), a desktop computer, a personal digital assistant (PDA), a smart phone, or any programmable electronic device capable of communicating with the heliostat controller 126 via network. The controller 200 can be a wearable computer, or electronic device worn by the user (e.g., as glasses, hats, clothing, accessories, etc.). In another embodiment, the controller 200 represents a computing system utilizing clustered computers and components to act as a single pool of seamless resources. In general, the controller 200 can be any computing device with access to a database. Controller 200 may include internal and external hardware components.

The controller 200 can have control circuitry 102 which can include any processing circuitry or unit including a microprocessor, or processor operative to control the operations and performance of the computing device. For example, control circuitry 102 can be used to run operating system applications, firmware applications, or any other application. In some embodiments, control circuitry 102 can drive a display and process inputs received from an interface.

The controller 200 can have storage 104 which can include, for example, one or more storage mediums including a hard-drive, solid state drive, flash memory, permanent memory such as ROM, any other suitable type of storage component, or any combination thereof. Storage 104 can store, for example, application data (e.g., for implementing functions on the computing device), firmware information (e.g., downline information, member information, compensation information, vacancy information, or network information), authentication information (e.g. libraries of data associated with authorized users), and any other suitable data or any combination thereof. The storage 104 can be positioned on the controller 200 or may reside on another device of the heliostat calibration system 400.

The controller 200 can have memory 106 which can include cache memory 106, semi-permanent memory such as RAM, and/or one or more different types of memory 106 used for temporarily storing data. In some embodiments, memory 106 can also be used for storing data used to operate computing device applications, or any other type of data that can be stored in storage 104. In some embodiments, memory 106 and storage 104 can be combined as a single storage 104 medium. In some embodiments, memory 106 and storage 104 are coupled to the processing unit.

The controller 200 can have I/O circuitry 108 which can be operative to convert (and encode/decode, if necessary) analog signals and other signals into digital data. In some embodiments, I/O circuitry 108 can also convert digital data into any other type of signal, and vice-versa. For example, I/O circuitry 108 can receive and convert physical contact inputs (e.g., from a multi-touch screen), physical movements (e.g., from a mouse or sensor), analog audio signals (e.g., from a microphone), or any other input. The digital data can be provided to and received from control circuitry 102, storage 104, memory 106, or any other component of computing device. Although I/O circuitry 108 is illustrated in FIG. 2 as a single component of computing device, several instances of I/O circuitry 108 can be included in computing device.

The controller 200 can have any suitable user interface or component for allowing a user to provide inputs to I/O circuitry 108. For example, computing device can include any suitable input mechanism, for example, a button, keypad, mouse, dial, a click wheel, or a touch screen. In some embodiments, computing device can include a capacitive sensing mechanism, or a multi-touch capacitive sensing mechanism.

The controller 200 can have specialized output circuitry associated with output devices such as, for example, one or more audio outputs, or the like. The audio output can include one or more speakers (e.g., mono or stereo speakers) built into computing device, or an audio component that is remotely coupled to computing device (e.g., a headset, headphones or earbuds that can be coupled to communications device with a wire or wirelessly).

The I/O circuitry 108 can include display circuitry (e.g., a screen or projection system) for providing a display visible to the user. For example, the display circuitry can include a screen (e.g., an LCD screen) that is incorporated into computing device. As another example, the display circuitry can include a movable display or a projecting system for providing a display of content on a surface remote from computing device (e.g., a video projector). In some embodiments, the display circuitry can include a coder/decoder (Codec) to convert digital media data into analog signals. For example, the display circuitry (or other appropriate circuitry within the computing device) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the computing device, information regarding ongoing communications operations, information regarding incoming communications requests, or device operation screens) under the direction of control circuitry 102. Alternatively, the display circuitry can be operative to provide instructions to a remote display.

The controller 200 can have communications circuitry 110 providing for communication between the controller 200 and the heliostat controller 126 through any suitable network, for example, a local area network (LAN), a wide area network (WAN) such as the Internet, or a combination of the two, and may include wired, wireless, fiber optic or any other connection known in the art. In general, the network can be any combination of connections and protocols that will support communications between the controller 200 and heliostat controller 126.

The controller 200 can be configured to be used and operated by a user to calculate the amount of error in the internal mirror angle.

Figure 3:
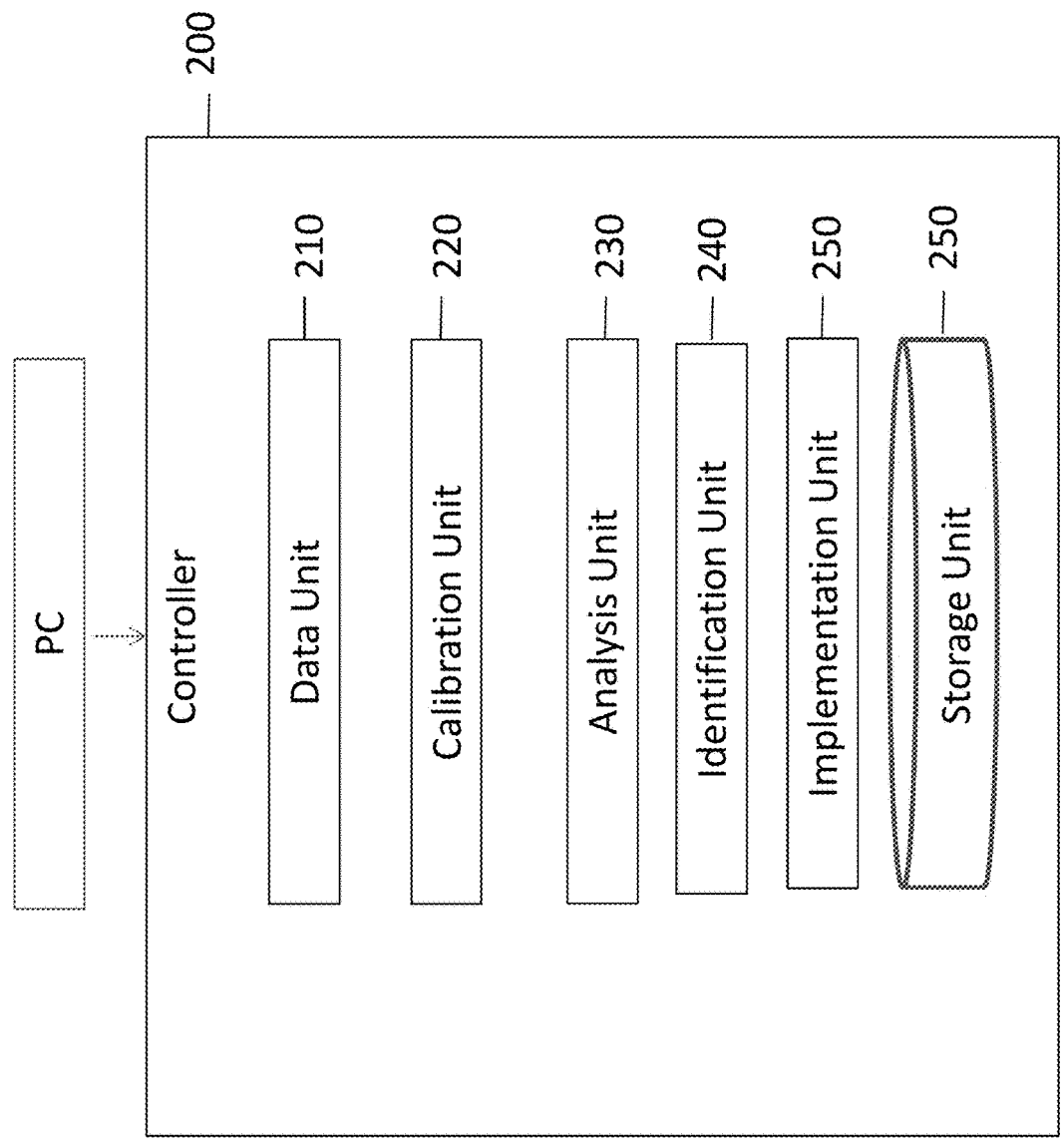
FIG. 3 is a schematic diagram of a controller, in accordance with one embodiment.

The controller 200 executes various operations based on instructions from a user, information received, and a program or data stored in the database, or the like. As shown in FIG. 3, the controller 200 can have data unit 210, calculation unit 220, analysis unit 230, identification unit 240, implementation unit 250, storage unit 260, or any combination thereof. In other words, the controller 200 operates based on the program stored in the storage unit 260 and serves as the data unit 210, calculation unit 220, analysis unit 230, identification unit 240, implementation unit 250, and storage unit 260.

In some embodiments, the controller 200 can be configured to receive the initial data 502. In some embodiments, the data unit 210 is configured to receive the initial data 502. In some embodiments, the data unit 210 can be configured to receive the initial data 502 from a user. Initial data 502 can be any information or data related to an initial characteristic of the system. The initial data 502 can be a calibration data point 504, a calibration offset angle guess, an acceptable tracking error value 509, or the like. The user can provide the initial data 502 by, for example, without limitation, the user entering the initial data 502 into a user interface of the controller 200, the user downloading the initial data 502, or the like. In some embodiments, data unit 210 can be configured to receive the initial data 502 from the heliostat controller 126. The controller 200 can be in operative communication with the heliostat controller 126 and adapted or configured to receive the initial data 502 from the heliostat controller 126.

In some embodiments, the controller 200 can be configured to receive a calibration data point 504. In some embodiments, the data unit 210 can be configured to receive a calibration data point 504 from a heliostat controller 126. In some embodiments, the controller 200 can be configured to receive at least one subsequent calibration data point 508, i.e. a calibration data point recorded at a different time than the recordation of the previous calibration data point. For example, without limitation, a subsequent calibration data point 508 can be a second calibration data point recorded after a first calibration data point.

In some embodiments, the controller 200 can be configured to receive an initial calibration offset angle guess 506. In some embodiments, the data unit 210 is configured to receive the initial calibration offset angle guess 506. An initial calibration offset angle guess 506 is an estimation of the amount of error in the internal mirror angle of the heliostat 120. In some embodiments, the data unit 210 can be configured to receive the initial calibration offset angle guess 506 from a user. The user can provide the information by, for example, without limitation, the user entering the initial calibration offset angle guess 506 into a user interface of the controller 200, the user downloading the initial calibration offset angle guess 506, or the like.

In some embodiments, the controller 200 can be configured to receive an acceptable tracking error value 509. In some embodiments, the data unit 210 is configured to receive the acceptable tracking error value 509. An acceptable tracking error value 509 can be the value or value range of the maximum tracking error 510 by which the user has determined is acceptable. In some embodiments, the data unit 210 can be configured to receive the acceptable tracking error value 509 from a user. The user can provide the information by, for example, without limitation, the user entering the acceptable tracking error value 509 into a user interface of the controller 200, the user downloading the acceptable tracking error value 509, or the like.

In some embodiments, the controller 200 can be configured to calculate the tracking error 510, i.e. a value associated with the initial calibration offset angle guess 506, or a subsequent calibration offset angle guess 512, and a calibration data point 504. The smaller the calculated tracking error 510, the more accurate the value of the associated calibration offset angle guess 506,512 is to the error in the internal mirror angle. For example, without limitation, where the calibration offset angle guess 506,512 results in the tracking error 510 to be zero, the value of the calibration offset angle guess 506,512 is the actual error in the internal mirror angle and where the calibration offset angle guess 506,512 results in the tracking error 510 to be close to zero, the value of the calibration offset angle guess 506,512 is very close to the actual error in the internal mirror angle. In some embodiments, the calculation unit 220 is configured to calculate the tracking error 510.

The tracking error 510 can be calculated by utilizing a tracking error function which relies on a modification of the following reflection equation:

$$r = d - 2(d \cdot n)n$$

where,
r is the 'Target Vector'
d is the 'Sun Vector'
n is the 'True Mirror Vector'.

To obtain the modified reflection equation, the internal mirror vector and a calibration offset angles are substituted and the equation becomes, $$r = d - 2(d \cdot n')n'$$

where,
r is the 'Target Vector'
d is the 'Sun Vector'
n' is the 'True Mirror Vector' in terms of the Internal Mirror Angle and the calibration offset angles.

For each calibration data point 504, a corresponding calibration offset angle guess 506,512 is utilized in performing the modified reflection equation. Performing the modified reflection equation results in a target position corresponding to each calibration data point 504. The difference between the calculated target positions is the tracking error 510 value. This difference can be found utilizing, for example, without limitation, the Least Squares Method.

In some embodiments, the controller 200 can be configured to identify the final tracking error 514. In some embodiments, the analysis unit 230 is configured to identify the final tracking error 514. The identification of the final tracking error 514 can be determined by comparing the value of the tracking error 510 with the value or value range of the acceptable tracking error 509 to determine whether the value of the tracking error 510 is at or within the corresponding value of the acceptable tracking error 509. For example, without limitation, where the value of the tracking error 510 is within the value range of acceptable tracking error 509, the tracking error 510 is identified as the final tracking error 514. By way of another example, without limitation, where the value of the tracking error 510 is not within the value range of the acceptable tracking error 509, the tracking error 510 is not identified as the final tracking error 514.

In some embodiments, the controller 200 can be configured to identify the calibration offset angle 516. In some embodiments, the identification unit 240 is configured to identify the calibration offset angle 516. The identification of the calibration offset angle 516 can be determined by identifying the calibration offset angle 516 associated with the final tracking error 514 value. For example, without limitation, where the final tracking error 514 value has been identified, the calibration offset angle guess 506,512 associated with the final error value is identified as the calibration offset angle 516.

In some embodiments, the controller 200 can be configured to calculate a subsequent calibration offset angle guess 512, i.e. a calibration offset angle guess made subsequent to a previous calibration offset angle guess. In some embodiments, the calculation unit 220 is configured to calculate the subsequent calibration offset angle guess 512. Where the tracking error 510 value does not fall within the acceptable tracking error value 509 range, a subsequent calibration offset angle guess 512 is identified. The subsequent calibration offset angle guess 512 can be identified by utilizing the previously calculated tracking error 510 value and an initial and/or subsequent calibration offset guesses 506,512 by performing a numerical method, for example, without limitation, Nedler-Mead algorithm, gradient descent algorithm, conjugate gradient algorithm, or the like.

In some embodiments, the controller 200 can be configured to store various values related to the heliostat calibration system 400. In some embodiments, the storage unit 260 is configured to store various values related to the heliostat calibration system 400, for example, without limitation, values related to the calibration data point 504, an initial or subsequent calibration offset angle guess 506,512, an acceptable tracking error value 509, a tracking error 510, a final tracking error 514, a calibration offset angle 516, the like, or a program for operating the data unit 210, calculation unit 220, analysis unit 230, identification unit 240, implementation unit 250, and storage unit 260, or the like.

In some embodiments, the controller 200 is configured to transmit adjustment instructions 520 to a heliostat controller 126. In some embodiments, the implementation unit 250 is configured to transmit adjustment instructions 520 to a heliostat controller 126. The adjustment instructions 520 can have information instructing a heliostat 120 to add the value of the calibration offset angle 516 associated with the value of the final tracking error 514 to the value of the internal mirror angle. In one embodiment, the value of the calibration offset angle 516 is added to the value of the limit switch angle. For example, without limitation, where the identified calibration offset angle 516 is 5°, the implementation unit 250 can transmit adjustment instructions 520 to the heliostat controller 126 to add 5° to the value of limit switch angle of the heliostat 120. The heliostat 120 can have a heliostat controller 126 as described herein in relation to the system controller 200 having control circuitry, storage, memory, I/O circuitry, input interface, output circuitry, display circuitry, communications circuitry, or any combination thereof.

In one embodiment, the heliostat calibration system 400 can have a heliostat 120 having a flat surface 104. FIG. 1A is a schematic diagram of a flat surface 104, in accordance with one embodiment of the present invention. Radiant solar energy 102 impinges on the flat surface 104. At least a first portion 106 of the radiant solar energy 102 is reflected off of the flat surface 104. The flat surface 104 can also absorb a second portion 103 of the radiant solar energy 102. The relative quantities of the reflected first portion of the radiant energy 106 and the absorbed second portion of the radiant energy 103 is determined by the types of materials in the flat surface 104 and the surface finish (e.g., reflectivity) of the flat surface 104. Radiant solar energy 102 can be reflected from a reflective surface (e.g., mirror or other reflective surface such as a polished surface).

The reflected first portion of the radiant energy 106 is reflected off of the flat surface 104 at an angle θ corresponding to the incident angle θ of the radiant solar energy 102. As a result the reflected first portion 106 is reflected off of the flat surface 104 in a dispersed fashion as the reflected first portion 106 is reflected in different angles corresponding to the different incident angles.

Figure 1B:
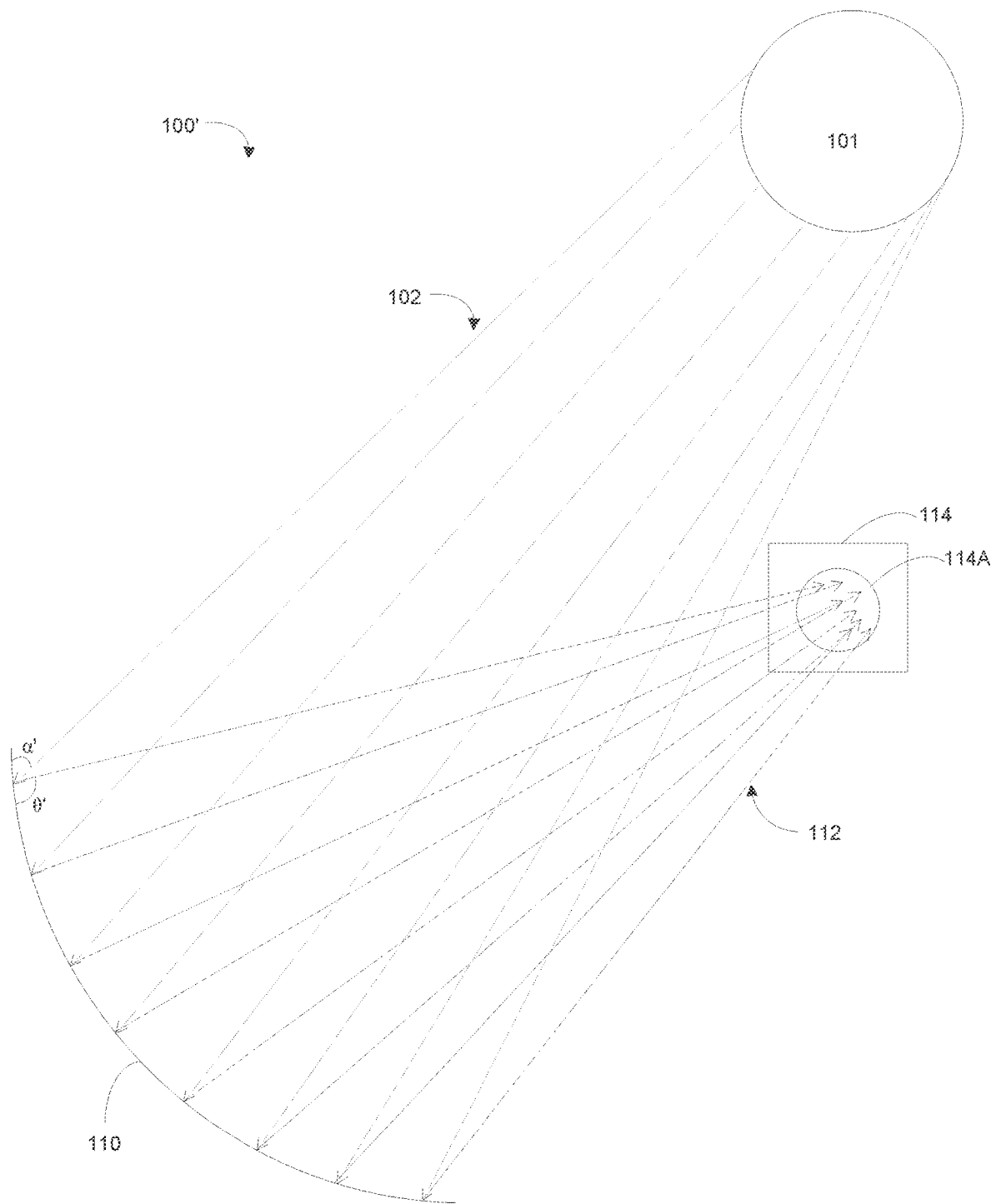
FIG. 1B is a schematic of a single curved reflective surface, in accordance with one embodiment.

As shown in FIG. 1B, a curved reflective surface 110 can focus or concentrate the reflected radiant energy 112. The reflected radiant energy 112 is reflected off of the curved surface 110 at an angle θ' corresponding to the incident angle θ' of the radiant solar energy 102 at the corresponding point on the curved surface. As a result, the reflected radiant energy 112 from the entire area of the curved surface 110 can be directed onto a selected or even a smaller area or focal point 114A on a heated object 114. The focal point 114A on the heated object 114 can have an area less than the area of the curved surface 110, thus the curved surface can concentrate the reflected radiant energy 112 on the focal point 114A on the heated object 114.

Figure 1C:
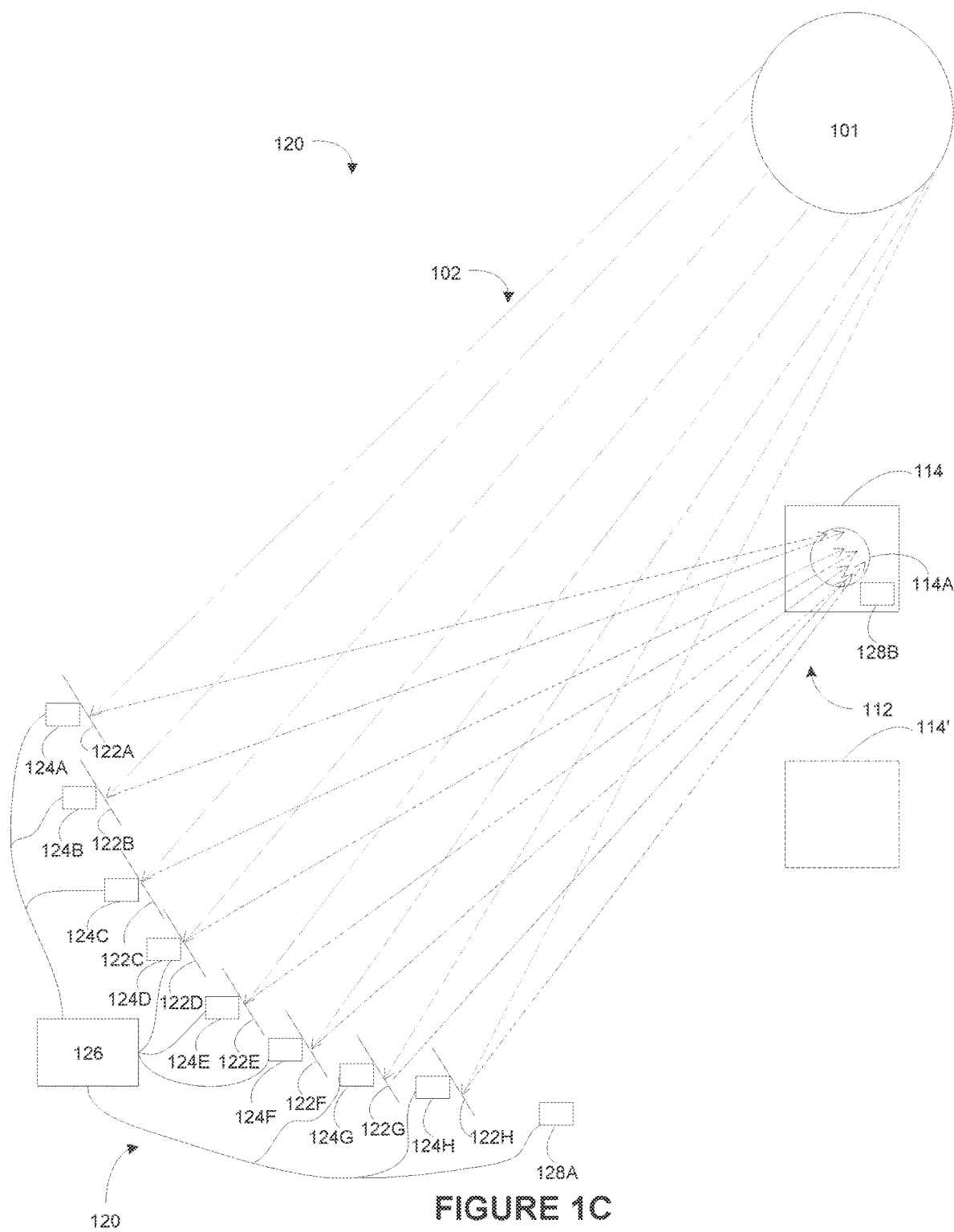
FIG. 1C is a schematic diagram of a heliostat system, in accordance with one embodiment.
Figure 1D:
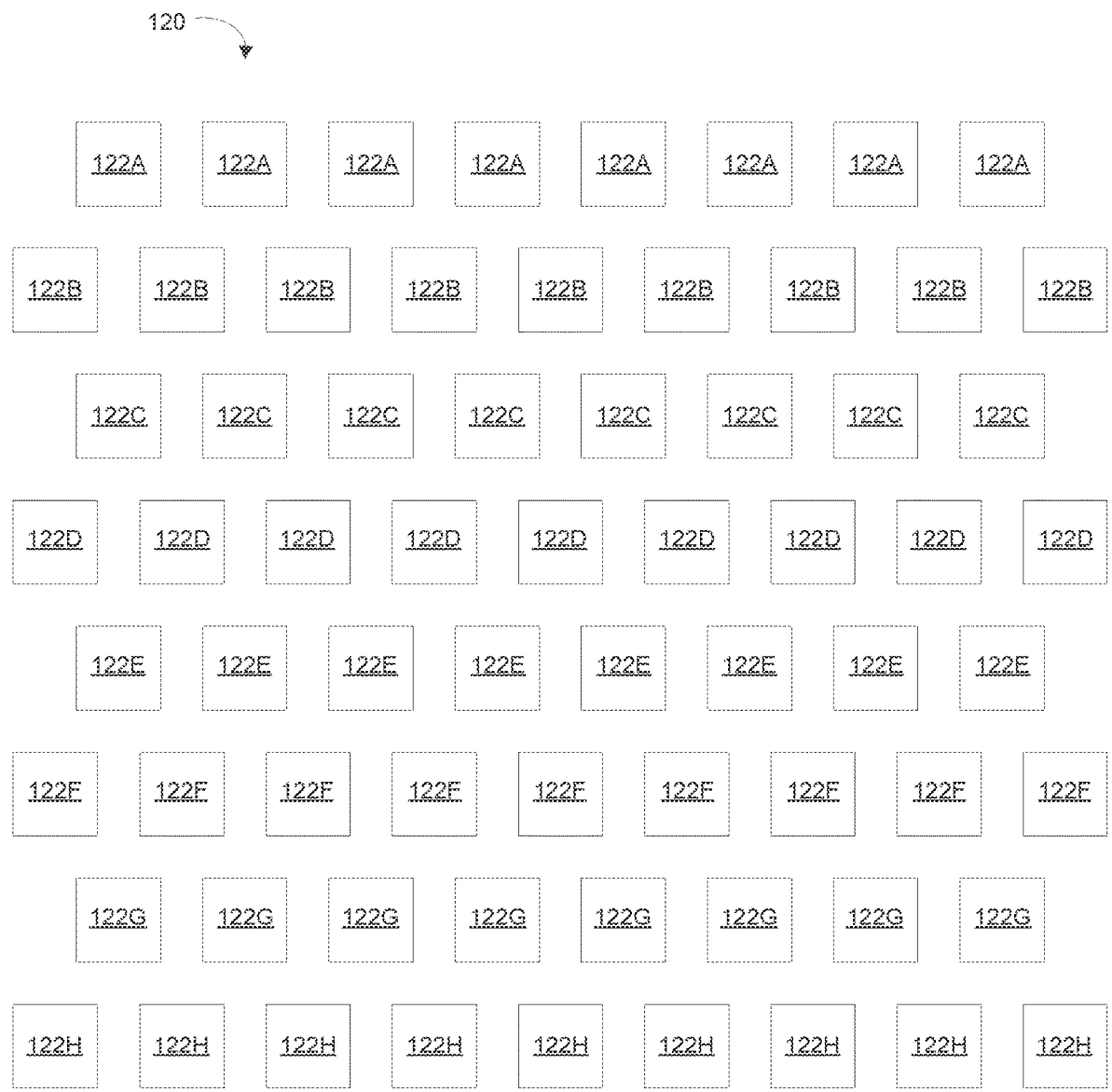
FIG. 1D is a schematic diagram of an array of reflective surfaces in a heliostat system, in accordance with one embodiment.
Figure 4A:
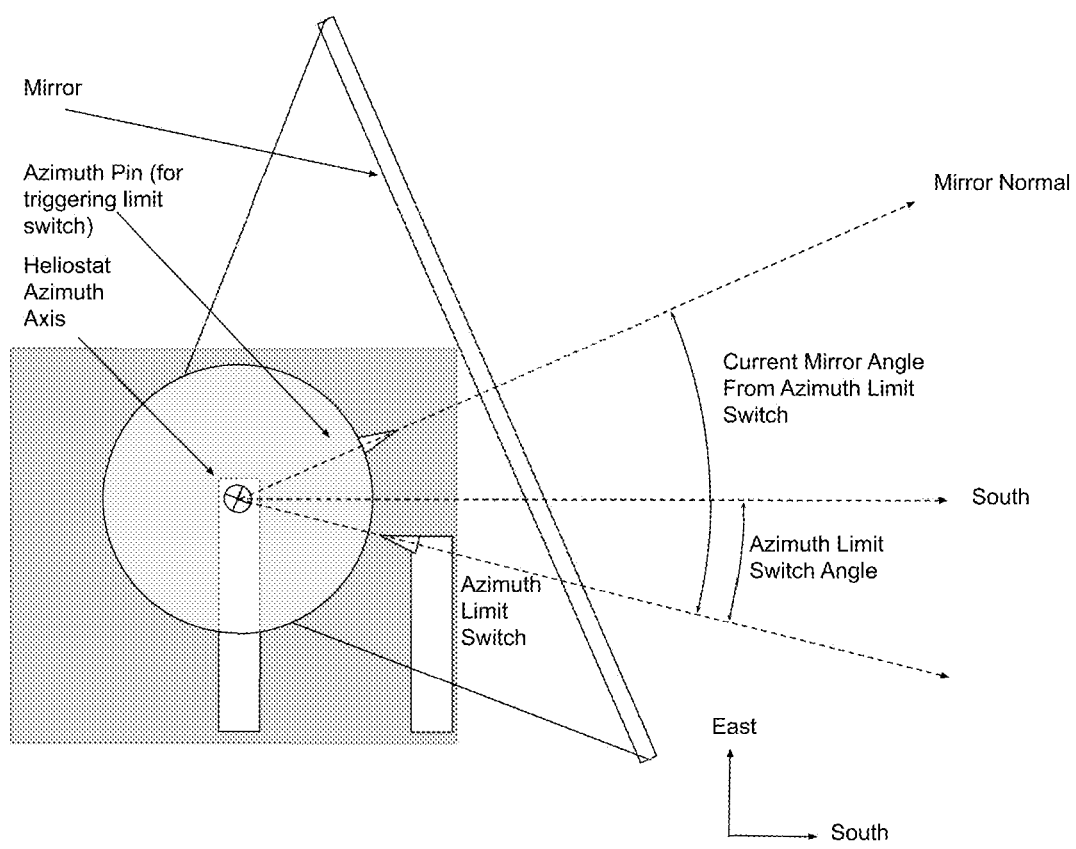
FIG. 4a is a schematic diagram of a heliostat, in accordance with one embodiment.
Figure 4B:
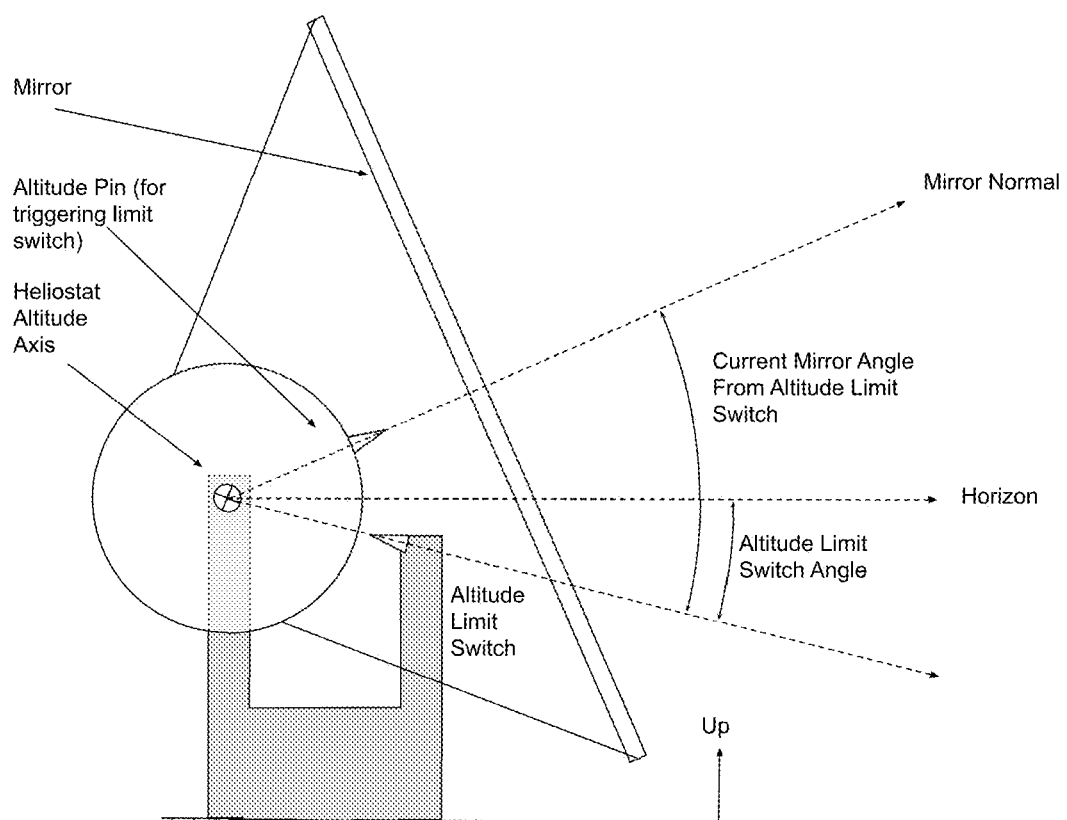
FIG. 4b is a schematic diagram of a heliostat, in accordance with one embodiment.
Figure 4C:
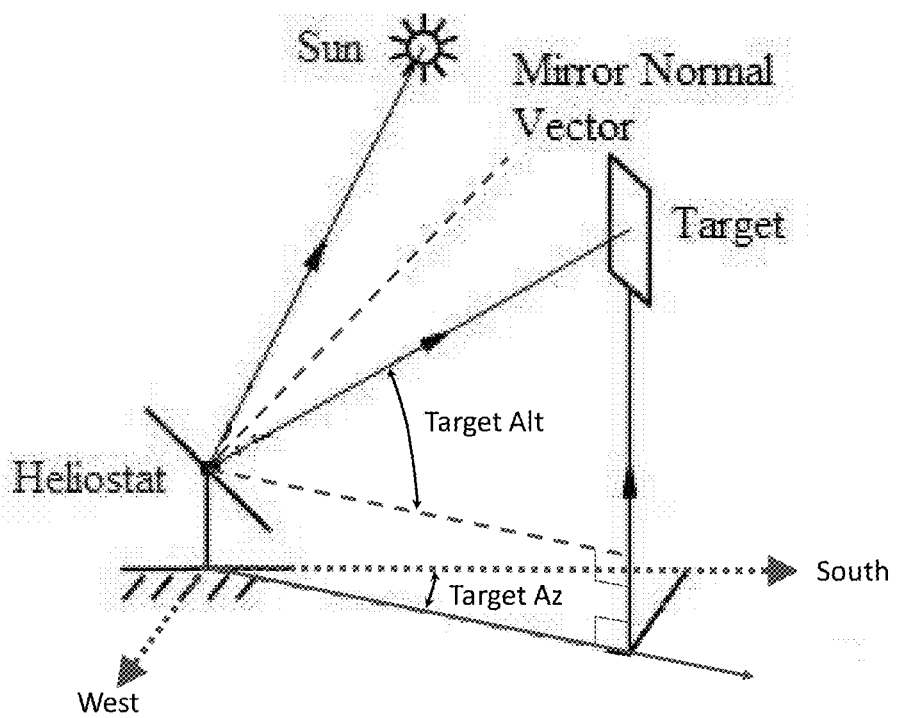
FIG. 4c is a schematic diagram of a heliostat, in accordance with one embodiment.

As shown in FIGS. 1C and 1D, the heliostat system 120, having at least one heliostat 120, can have multiple flat or curved reflective surfaces 122A-H. The reflective surfaces 122A-H are coupled to one or more motors 124A-H. The motors 124A-H are coupled to a heliostat controller 126. The heliostat controller 126 can control the motors 124A-H to steer or otherwise move selective ones of the reflective surfaces 122A-H so that a portion of the incident radiant energy 102 is reflected radiant energy 112 and is directed toward and, optionally concentrated in a target area 116 on the heated object 114. The target area 116 is the radial area from the axis of rotation of the heated object 114 between a first radial position 116a from the axis of rotation of the heated object 114 and a second radial position 116b from the axis of rotation of the heated object 114, both first radial position 116a and second radial position 116b measured from the target area start position 116c. The target area 116 can be defined as radial degrees from the axis of rotation of the heated object 114, as incremental rotational steps from the axis of rotation of the heated object 114, or the like. For example, without limitation, as shown in FIG. 4, where the first radial position 116a and second radial position 116b are defined in terms of degrees, the first radial position 116a is 225° and the second radial position 116b is 315° thereby defining the target area 116 as between 225° and 315°. The heliostat controller 126 can be configured to receive and/or transmit information related to the amount of reflected radiant energy 112 directed toward the heated object 114. The heated object 114 can be a hollow object such as a mold for forming plastic products such as storage tanks, water vessels, shipping containers, or the like, drum for roasting agricultural products, or the like.

The heliostat controller 126 can selectively steer each of the reflective surfaces 122A-H individually or in combination. The reflective surfaces 122A-H can concentrate the reflected radiant energy 112 on the affected portion 114b of the heated object 114.

Figure 2A:
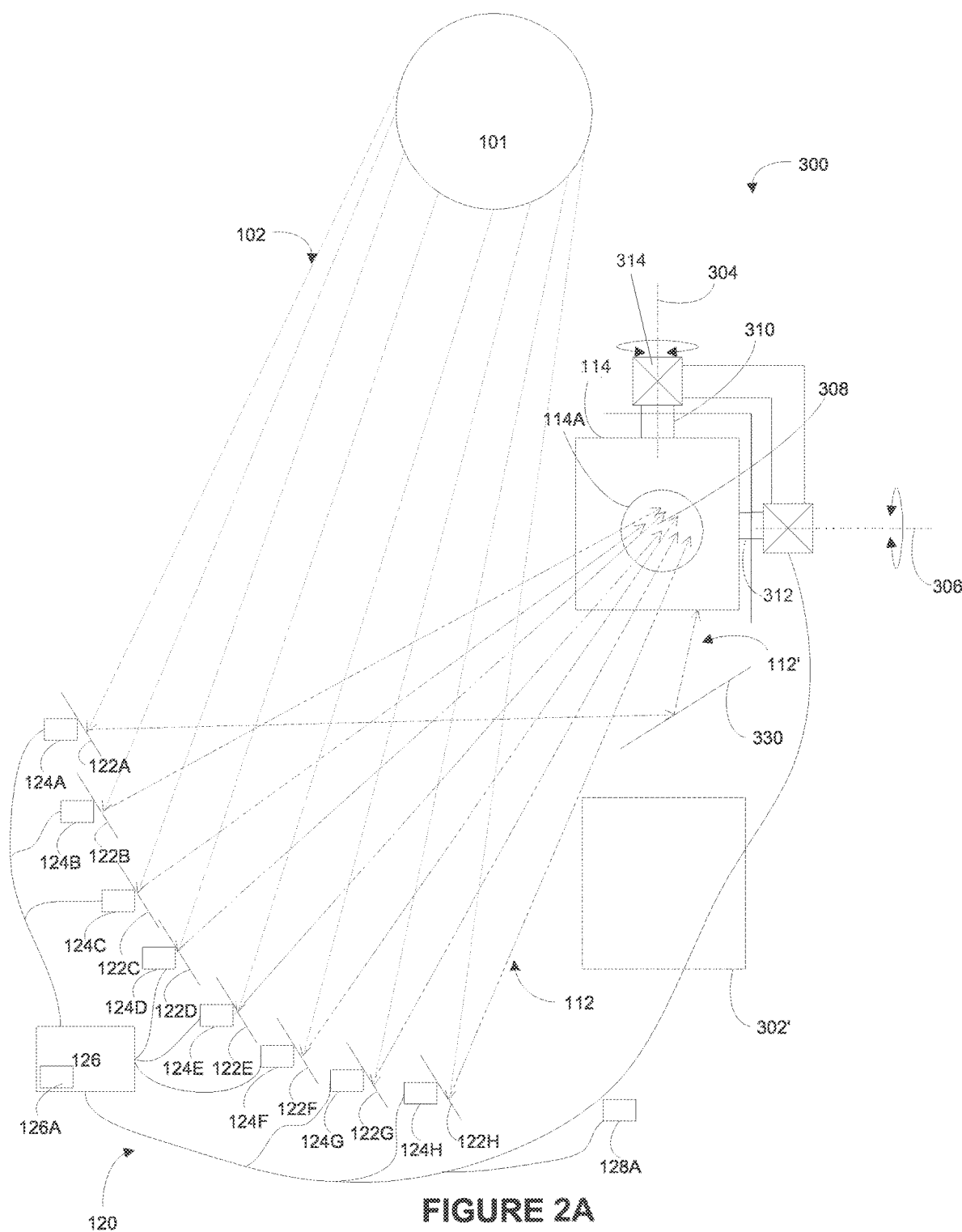
FIG. 2A is a schematic diagram of a solar rotational manufacturing system, in accordance with one embodiment.
Figure 2B:
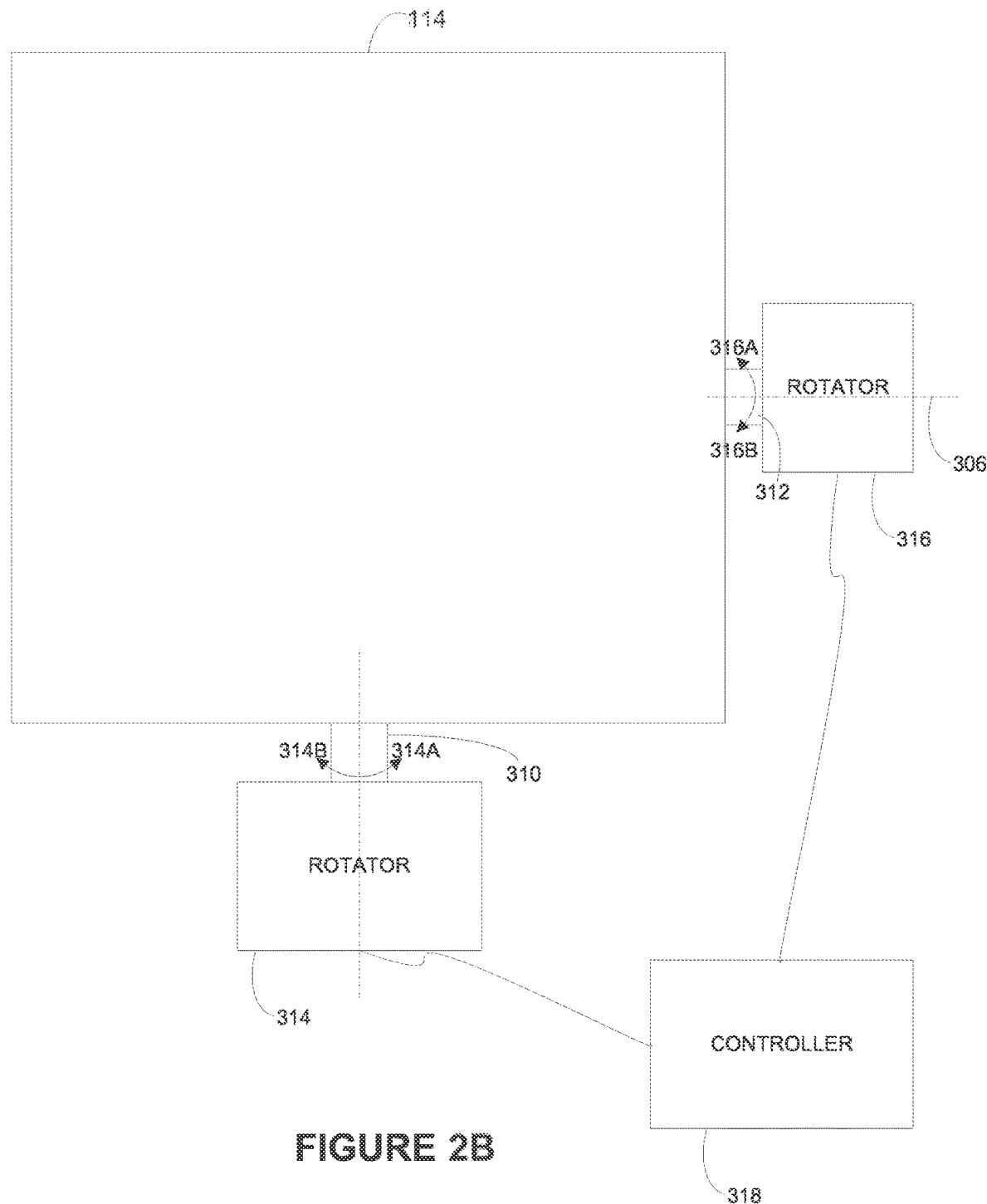
FIG. 2B is a schematic diagram of a rotational apparatus, in accordance with one embodiment.

In one embodiment, as shown in FIGS. 2A & 2B, the heliostat calibration system 400 can have a rotational apparatus 300 configured to rotate the heated object 114. The rotational apparatus 300 can be configured to rotate on at least two axes 304 and 306. It should be understood that the rotational apparatus 300 could also be rotational in a third axis 308 (e.g., perpendicular with the surface of the drawing) with minor modification to the concept. However to simplify the discussion and description only two axis 304 and 306 is discussed.

The rotational apparatus 300 includes a first rotator 314 for rotating the heated object 114 on the first axis 304 in directions 314A, 314B. The first rotator 314 is coupled to the heated object 114 by the shaft 310. The rotational apparatus 300 includes a second rotator 316 for rotating the heated object 114 on the second axis 306 in directions 316A, 316B. The second rotator 316 is coupled to the heated object 114 by the shaft 312. The first rotator 314 and the second rotator 316 can be any suitable rotational mechanism. The rotational apparatus 300 can have a rotational controller 200 318 configured to receive and/or transmit information related to the rotation of the rotational apparatus 300.

In some embodiments, the heliostat controller 126 is configured to position the heliostat 120 so that the reflection of the radiant solar energy 102 impinges upon a calibration target.

In some embodiments, the heliostat controller 126 is configured to record a calibration data point 504.

In some embodiments, the heliostat controller 126 is configured to transmit a calibration data point 504 to the system controller 200.

In some embodiments, the heliostat controller 126 is configured to receive adjustment instructions 520. The adjustment instructions 520 can be transmitted by the system controller 200. Adjustment instructions 520 can be information instructing the heliostat 120 to adjust the internal mirror angle, for example, without limitation, information regarding the value of the calibration offset angle 516 to add to the internal mirror angle.

In some embodiments, the heliostat controller 126 is configured to execute the adjustment instructions 520. For example, without limitation, where the adjustment instructions 520 instruct the heliostat 120 to adjust the internal mirror angle, the heliostat controller 126 executes the adjustment instructions 520 by adding the value of the calibration offset angle 516 to the internal mirror angle.

In some embodiments, the heliostat controller 126 is configured to determine the mirror position necessary for tracking. The mirror position can be determined by calculating the mirror position or retrieving the mirror position from a database.

In some embodiments, the heliostat controller 126 is configured to instruct the heliostat 120 to point the heliostat mirror to a target position. The heliostat mirror can be pointed to the target position by adjusting the internal mirror angle with the mirror position necessary for tracking.

While the heliostat 120 and the system controller 200 are depicted to be separate devices capable of communicating with each other via a wired or wireless connection, this is not meant to be limiting. The heliostat 120 and system controller 200 can be combined into one computing device.

The heliostat controller 126 is operative communication with the system controller 200 in the sense that they are configured to communicate information in the form of digital data at least from one device to the other and preferably bi-directionally between the two devices, directly or indirectly (e.g., via an intermediate processor). This operative communication may be enabled through a direct connector (such as printed circuit board connector or slot), a docking station, a cable, or wirelessly.

The system controller 200 can have the capability to transmit adjustment instructions 520, recalibration instructions 530, or the like, to the heliostat controller 126. Preferably, the communications capability comprises data receiving capabilities so that the system controller 200 can transmit and receive data bi-directionally, both to and from the heliostat controller 126, via a wired or wireless connection. The heliostat controller 126 and system controller 200 can have a data modem, a wireless transceiver, or combinations thereof, for transmitting information.

The system controller 200 and/or heliostat controller 126 can have receivers and/or transmitters. The receivers can be configured to receive instructions and/or data from a corresponding device, such as the system controller 200 and/or heliostat controller 126. For example, without limitation, a receiver can allow the heliostat controller 126 to receive data from the system controller 200. The transmitters can be configured to transmit instructions and/or data from a corresponding device, such as a system controller 200 and/or heliostat controller 126. For example, without limitation, a transmitter can allow the system controller 200 to transmit instructions to the heliostat controller 126.

The receivers and/or transmitters, and the devices corresponding thereto, can be configured to communicate over a wired connection or over a wireless connection, such as via Ethernet, LAN, WAN, Bluetooth, WiFi, IR communication, or the like.

In each of the system and method embodiments described herein, the heliostat calibration method and other methods as described herein are carried out using software, including, without limitation, software application, hardware application, mobile application, or the like. The software may include executable program code that directs any of the disclosed devices or systems, for example, without limitation, the system controller 200, heliostat controller 126, or the like, to implement the method. In general, any of the functions described herein as being performed by the software could be implemented on any of the disclosed devices or systems, for example, without limitation, the system controller 200, heliostat controller 126, or the like. To illustrate these aspects of the disclosure, a method is described.

Figure 5:
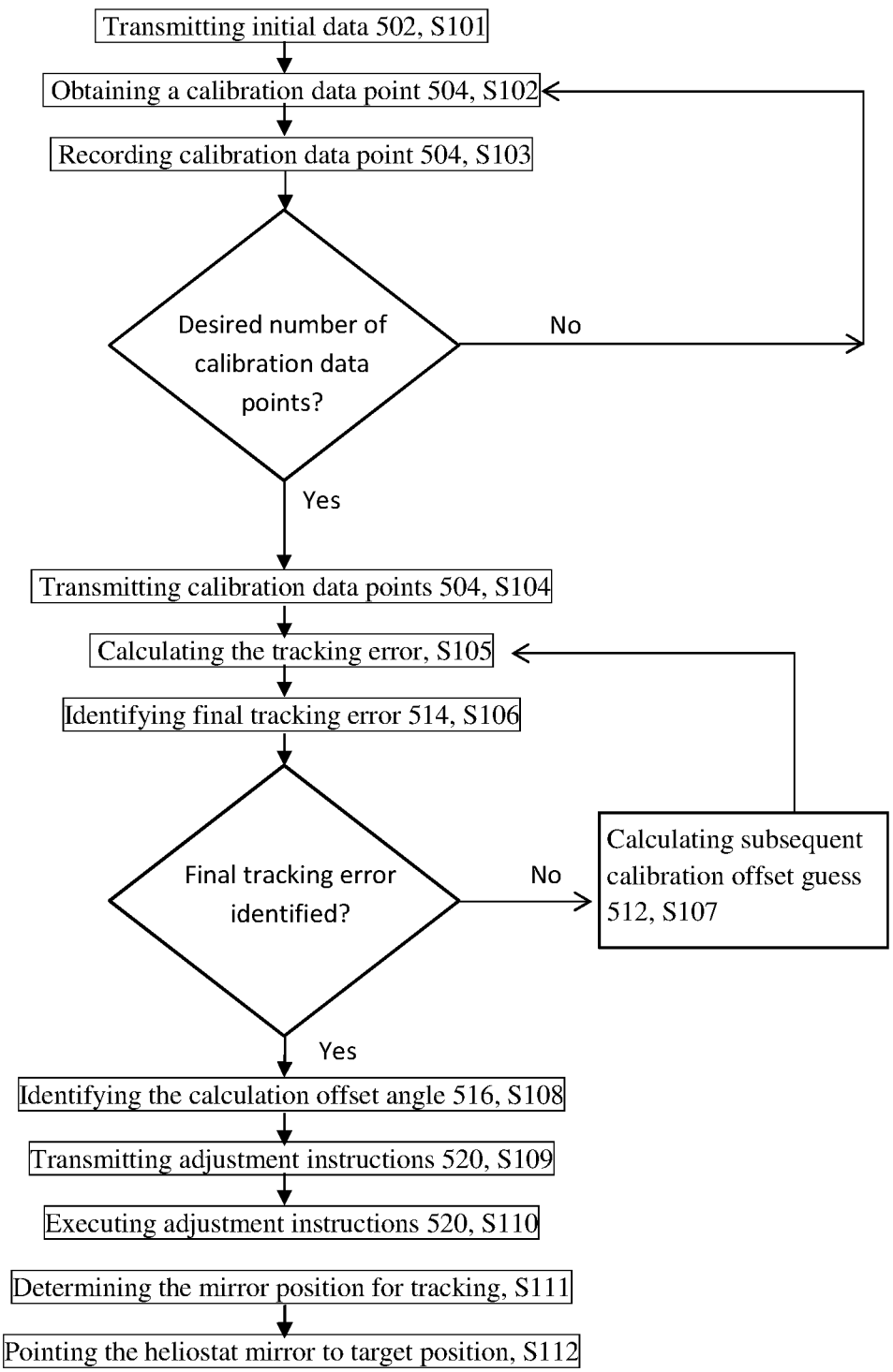
FIG. 5 is a flow chart of a method, in accordance with one embodiment.

FIG. 5 is a flowchart illustrating an embodiment of a method of calculating the calibration offset angle 516 that can be used to calibrate the internal mirror angle of a heliostat 120.

In some embodiments, as shown in FIG. 5 in Step S101, the method has the step of transmitting initial data 502 by the heliostat controller 126. In one embodiment, the initial calibration offset angle guess 506 and/or the acceptable tracking error 510, are transmitted by the heliostat controller 126.

In some embodiments, the method has the step of receiving initial data 502 by the controller 200. The controller 200 can receive the initial data 502 from the heliostat controller 126, from a source know to have initial data 502, for example, without limitation, by the user inputting the initial data 502 into the controller 200 via the user interface, or the like. For example, without limitation, the initial calibration offset angle guess 506 and/or the acceptable tracking error 510 are received by the controller 200 by the user inputting the initial calibration offset angle guess 506 and the acceptable tracking error 510. The initial data 502 can be transferred to the processor of the controller 200 or stored directly in the storage 104.

In some embodiments, as shown in FIG. 5 in Step S102, the method has the step of obtaining a calibration data point 504 by the heliostat controller. The step of obtaining a calibration data point 504 can have the steps of positioning the heliostat 120 by the heliostat controller 126 so that the radiant solar energy 102 impinges upon a calibration target. In some embodiments, as shown in FIG. 5 in Step S103, the method has the step of recording a calibration data point 504 by the heliostat controller 126.

In some embodiments, as shown in FIG. 5, where the desired number of calibration data points 504 is not obtained, the method has the step of performing the calibration data point loop by the heliostat controller 126. The step of performing the calibration data point loop can have at least one iteration where each iteration has the step of positioning the heliostat 120 by the heliostat controller 126 so that the radiant solar energy 102 impinges upon a calibration target and recording a subsequent calibration data point 508 by the heliostat controller 126.

In some embodiments, as shown in FIG. 5 in Step S104, the method has the step of transmitting a calibration data point 504 and at least one subsequent calibration data point 508 by the heliostat controller 126 to the controller 200.

In some embodiments, the method has the step of receiving a calibration data point 504 and at least one subsequent calibration data point 508 by the controller 200.

In some embodiments, as shown in FIG. 5 in Step S105, the method has the step of calculating the tracking error 510 by the controller 200. In some embodiments, the tracking error 510 is calculated by performing the tracking error function utilizing the modified reflection equation with at least two calibration date points 504,508 and at least two corresponding calibration offset angle guesses 506,512, and calculating the difference in the resulting target positions utilizing the Least Squares Method.

In some embodiments, as shown in FIG. 5 in Step S106, the method has the step of identifying the value of the final tracking error 514 by the controller 200. The step of identifying the value of the final tracking error 514 can have the steps of comparing the calculated value of the tracking error 510 with the value of the acceptable tracking error 509 and determining whether the tracking error 510 value is within the corresponding value of the acceptable tracking error 510.

In some embodiments, where the tracking error 510 value is within the acceptable tracking error value 509, the method has the step of identifying the value of the tracking error 510 as the value of the final tracking error 514.

In some embodiments, as shown in FIG. 5, where the value of the calculated tracking error 510 is not at or within the value of the acceptable tracking error 509, the method has the step of performing the tracking error loop by the controller 200. The step of performing the tracking error loop can have at least one iteration where each iteration has the step of calculating a subsequent calibration offset angle guess 512 by the controller 200, as shown in FIG. 5 Step S107, and calculating the tracking error 510 by performing the tracking error function by the controller 200.

The step of calculating a subsequent calibration offset angle guess 512 by the controller 200 utilizes the previously calculated tracking error 510 value and the initial or previous calibration offset guess 506,512 by the controller 200 to perform a numerical method, for example, without limitation, Nedler-Mead algorithm, gradient descent algorithm, conjugate gradient algorithm, or the like.

The step of performing the tracking error function by the controller 200 utilizes performing the modified reflection equation with the subsequent calibration offset angle guesses 512 for each calibration data point 504 and calculating the difference between the resulting calculated target positions utilizing, for example, without limitation the Least Squares Method.

In some embodiments, as shown in FIG. 5 in Step S108, where the value of the final tracking error 514 has been identified, the method has the step of identifying the calibration offset angle 516 by the controller 200. For example, without limitation, the calibration offset angle guess 506 associated with the final tracking error 514 can be identified by the controller 200 as the calibration offset angle 516.

In some embodiments, as shown in FIG. 5 in Step S109, the method has the step of transmitting adjustment instructions 520 by the controller 200. For example, without limitation, the adjustment instructions 520 instructing the heliostat 120 to add the value of the calibration offset angle 516 to the internal mirror angle are transmitted by the controller 200 to the heliostat controller 126.

In some embodiments, as shown in FIG. 5 in Step S110, the method has the step of executing the adjustment instructions 520 by the heliostat controller 126. For example, without limitation, where the adjustment instructions 520 instruct the heliostat 120 to adjust the internal mirror angle, the heliostat controller 126 adds the value of the calibration offset angle 516 to the internal mirror angle.

In some embodiments, as shown in FIG. 5 in Step S111, the method has the step of determining the mirror position necessary for tracking by the heliostat controller 126. For example, without limitation, the step of determining the mirror position has the step of calculating the mirror position.

In some embodiments, as shown in FIG. 5 in Step S112, the method has the step of instructing the heliostat 120 to point the heliostat mirror to a target position by the heliostat controller 126.

If the heliostat 120 is disturbed, for example, without limitation, it is knocked over, bumped, etc., the heliostat 120 can be recalibrated utilizing the recalibration system 500 by calculating a new calibration offset angle 516 and applying this new calibration offset angle 516 to the internal mirror angle.

In some embodiments, the recalibration system 500 can include a system controller 200 and/or a heliostat controller 126.

In some embodiments, the controller 200 can be configured to calculate a target position utilizing the modified reflection equation, the previously identified calibration offset angle 516, and a calibration data point 504. In some embodiments, the calculation unit 220 is configured to calculate the target position.

In some embodiments, the controller 200 can be configured to calculate a new calibration offset angle 516 by calculating the difference between the internal mirror angle before positioning the heliostat 120 to impinge radiant solar energy 102 on the target position and the internal mirror angle after moving the heliostat 120 to impinge reflected radiant solar energy 102 on the target position. In some embodiments, the calculation unit 220 is configured to calculate the new calibration offset angle 516.

In some embodiments, the controller 200 can be configured to transmit recalibration instructions 530 having a new calibration offset angle guess 512 to the heliostat controller 126. In some embodiments, the implementation unit 250 is configured to transmit recalibration instructions 530 to a heliostat controller 126. The recalibration instructions 530 can have information instructing a heliostat 120 to add the value of the new calibration offset angle 516 to the value of the internal mirror angle. In one embodiment, the value of the new calibration offset angle 516 is added to the value of the limit switch angle.

In some embodiments, the heliostat controller 126 is configured to record the initial internal mirror angle, i.e. the internal mirror angle prior to positioning the heliostat 120 so that the reflection of the radiant solar energy 102 impinges upon a calibration target.

In some embodiments, the heliostat controller 126 is configured to position the heliostat 120 so that the reflection of the radiant solar energy 102 impinges upon a calibration target.

In some embodiments, the heliostat controller 126 is configured to record the subsequent internal mirror angle, i.e. the internal mirror angle after positioning the heliostat 120 so that the reflection of the radiant solar energy 102 impinges upon a calibration target.

In some embodiments, the heliostat controller 126 is configured to transmit the initial internal mirror angle and subsequent internal mirror angle to the controller 200.

In some embodiments, the heliostat controller 126 is configured to receive recalibration instructions 530. The recalibration instructions 530 can be transmitted by the system controller 200. Recalibration instructions 530 can be information instructing the heliostat 120 to adjust the internal mirror angle, for example, without limitation, information regarding the value of the new calibration offset angle 516 to add to the internal mirror angle.

In some embodiments, the heliostat controller 126 is configured to execute the recalibration instructions 530. For example, without limitation, where the recalibration instructions 530 instruct the heliostat 120 to adjust the internal mirror angle, the heliostat controller 126 executes the recalibration instructions 530 by adding the value of the new calibration offset angle 516 to the internal mirror angle.

In some embodiments, the heliostat controller 126 is configured to determine the mirror position necessary for tracking. The mirror position can be determined by calculating the mirror position or retrieving the mirror position from a database.

In some embodiments, the heliostat controller 126 is configured to instruct the heliostat 120 to point the heliostat mirror to a target position. The heliostat mirror can be pointed to the target position by adjusting the internal mirror angle with the mirror position necessary for tracking.

Figure 6:
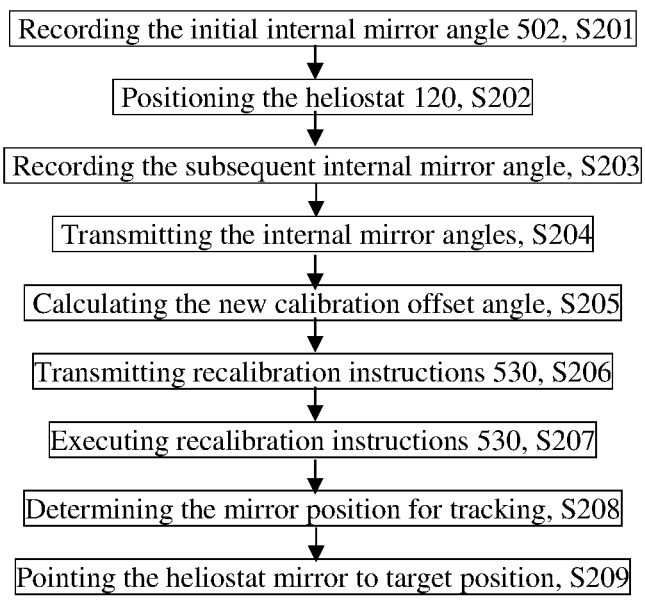
FIG. 6 is a flow chart of a method, in accordance with one embodiment.

FIG. 6 is a flowchart illustrating an embodiment of a method of recalculating a new calibration offset angle 516 that can be used to recalibrate the internal mirror angle of a heliostat 120.

In some embodiments, as shown in FIG. 6 in Step S201, the method has the step of recording the initial internal mirror angle by the heliostat controller 126.

In some embodiments, as shown in FIG. 6 in Step S202, the method has the step of positioning the heliostat 120 by the heliostat controller 126 so that the reflection of the radiant solar energy 102 impinges upon a calibration target.

In some embodiments, as shown in FIG. 6 in Step S203, the method has the step of recording the subsequent internal mirror angle by the heliostat controller 126.

In some embodiments, as shown in FIG. 6 in Step S204, the method has the step of transmitting the initial internal mirror angle and the subsequent internal mirror angle by the heliostat controller 126.

In some embodiments, the method has the step of receiving the initial internal mirror angle and the subsequent internal mirror angle by the heliostat controller 126.

In some embodiments, as shown in FIG. 6 in Step S205, the method has the step of calculating a new calibration offset angle 516 by the controller 200. For example, without limitation, the new calibration offset angle 516 can be calculated by the controller 200 calculating the difference between the internal mirror angle before positioning the heliostat 120 to impinge radiant solar energy 102 on the target position and the internal mirror angle after moving the heliostat 120 to impinge reflected radiant solar energy 102 on the target position.

In some embodiments, as shown in FIG. 6 in Step S206, the method has the step of transmitting recalibration instructions 530 having a new calibration offset angle 516 by the controller 200.

In some embodiments, the method has the step of receiving recalibration instructions 530 having a new calibration offset angle 516 by the controller 200.

In some embodiments, as shown in FIG. 6 in Step S207, the method has the step of executing the recalibration instructions 530 by the heliostat controller 126. For example, without limitation, where the recalibration instructions 530 instruct the heliostat 120 to adjust the internal mirror angle, the heliostat controller 126 adds the value of the new calibration offset angle 516 to the internal mirror angle.

In some embodiments, as shown in FIG. 6 in Step S208, the method has the step of determining the mirror position necessary for tracking by the heliostat controller 126. For example, without limitation, the step of determining the mirror position has the step of calculating the mirror position.

In some embodiments, as shown in FIG. 6 in Step S209, the method has the step of instructing the heliostat 120 to point the heliostat mirror to a target position by the heliostat controller 126.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items. In addition, the term "or" is used in its inclusive sense (and not in its exclusive sense) so that when used, for example, to connect a list of elements, the term "or" means one, some, or all of the elements in the list.

Conditional language "can," "could," "might," "may," "e.g.," and the like, unless specifically stated otherwise, is intended to convey that certain embodiments include, while other embodiments do not include, certain features, elements and/or steps. Such conditional language does not convey that features, elements and/or steps are required for one or more embodiments or that one or more embodiments necessarily include logic for deciding, with or without other input or prompting, whether these features, elements and/or steps are included or are to be performed in any particular embodiment.

Disjunctive language such as the phrase "at least one of A, B, or C," unless specifically stated otherwise, is understood that an item, term, or the like, may be either A, B, or C, or any combination thereof (for example, A, B, and/or C). Such disjunctive language should not be interpreted that certain embodiments require at least one of X, at least one of Y, and at least one of Z to each be present.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A heliostat calibration system comprising:
a system controller, and
a heliostat having a heliostat controller that is in communication with the system controller, wherein:
the system controller is configured to receive a calibration data point and an initial calibration offset angle estimation, calculate a tracking error, identify a calibration offset angle, and transmit adjustment instructions to the heliostat controller,
the heliostat controller is configured to record and transmit a calibration data point to, and receive adjustment instructions from, the system controller, and execute the adjustment instructions,
either the system controller or the heliostat controller is configured to receive a maximum tracking error value or value range inputted by a user,
the heliostat controller is also configured to record and transmit at least one subsequent calibration data point, which is recorded at a different time than a previous calibration data point, and
the system controller is also configured to calculate at least one subsequent tracking error, identify a calibration offset angle, and transmit adjustment instructions to the heliostat controller until the calculated tracking error matches or is within the maximum tracking error value or value range,
wherein the system controller is configured to calculate the tracking error by utilizing a modified reflection equation that includes an error term that is the calibration offset angle.

2. The system of claim 1, wherein the system controller is configured to identify a final tracking error.

3. The system of claim 1, wherein the modified reflection equation is r=d−2(d·n')n', wherein r is a Target Vector, d is a Sun Vector, and n' is a True Mirror Vector in terms of an Internal Mirror Angle and a Calibration Offset Angle.

4. The heliostat calibration system of claim 1, wherein the calibration data point is determined using internal mirror positions on the heliostat controller.

5. The heliostat calibration system of claim 1, wherein the calibration offset angle is defined by only Altitude and Azimuth angles.

6. A method for calibrating a heliostat, the method comprising the steps of:
by a system controller in communication with a heliostat controller, receiving a calibration data point, receiving an initial calibration offset angle estimation, calculating a tracking error, identifying a calibration offset angle, and transmitting adjustment instructions to the heliostat controller, and
by the heliostat controller,
recording and transmitting a calibration data point,
receiving adjustment instructions from the system controller, and
executing the adjustment instructions,
wherein further by either the system controller or the heliostat controller, receiving a maximum tracking error value or value range inputted by a user,
wherein further by the heliostat controller, recording and transmitting at least one subsequent calibration data point, which is recorded at a different time than a previous calibration data point,
wherein further by the system controller, calculating at least one subsequent tracking error, identifying a calibration offset angle, and transmitting adjustment instructions to the heliostat controller until the calculated tracking error matches or is within the maximum tracking error value or value range,
wherein the method further comprises the step of, by the system controller, calculating the tracking error by utilizing a modified reflection equation that includes an error term that is the calibration offset angle.

7. The method of claim 6, further comprising the step of, by the system controller, identifying a final tracking error.

8. The method of claim 6, wherein the modified reflection equation is r=d−2(d·n')n', wherein r is a Target Vector, d is a Sun Vector, and n' is a True Mirror Vector in terms of an Internal Mirror Angle and a Calibration Offset Angle.

9. The method for calibrating a heliostat of claim 6, wherein the calibration data point is determined using internal mirror positions on the heliostat controller.

10. The method for calibrating a heliostat of claim 6, wherein the calibration offset angle is defined by only Altitude and Azimuth angles.

* * * * *